UNITED STATES PATENT OFFICE.

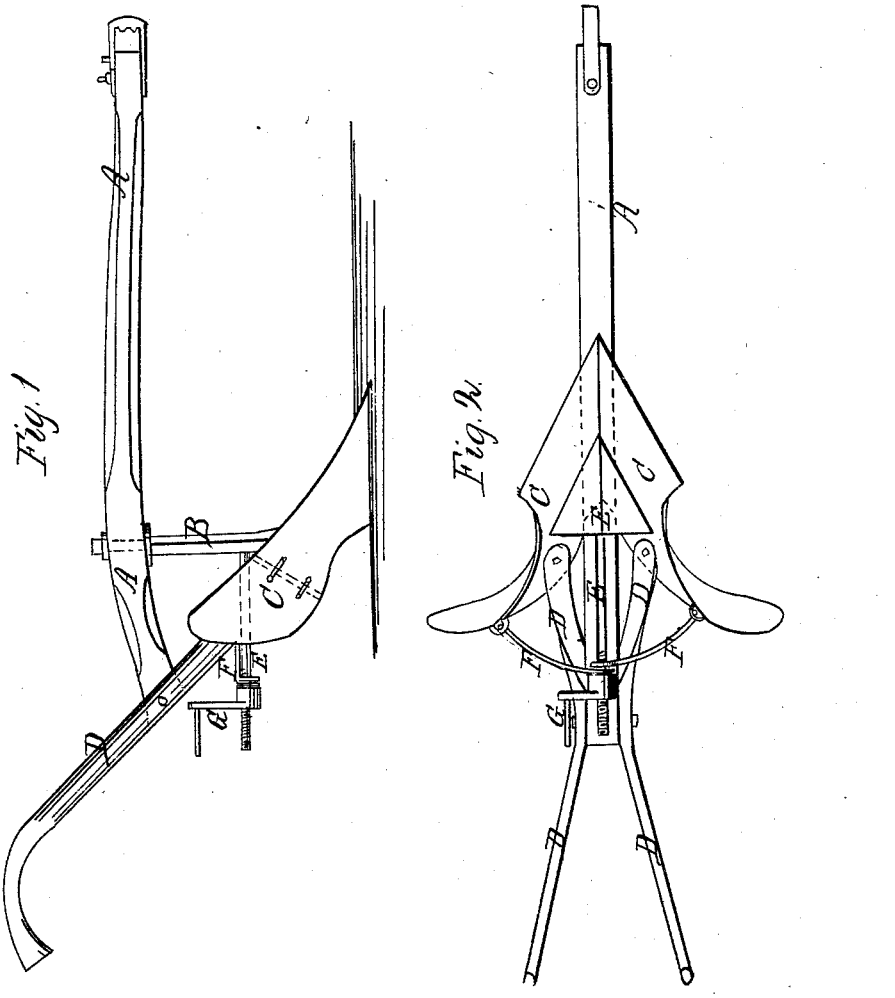

HENRY NOLTE, OF LINCOLN, ILLINOIS.

IMPROVEMENT IN PLOWS.

Specification forming part of Letters Patent No. 94,634, dated September 7, 1869.

*To all whom it may concern:*

Be it known that I, HENRY NOLTE, of Lincoln, in the county of Logan and State of Illinois, have invented a new and useful Improvement in Plows; and I do hereby declare that the following is a full, clear, and exact description thereof, which will enable others skilled in the art to make and use the same, reference being had to the accompanying drawings, forming part of this specification, in which—

Figure 1 is a side view of my improved plow. Fig. 2 is a bottom view of the same.

Similar letters of reference indicate corresponding parts.

My invention has for its object to furnish an improved plow, simple in construction and effective in operation, for plowing and cultivating plants planted in rows, when of such a character or size as to require to have the soil turned about the said plants; and it consists in providing the hinged mold-boards of the plow with a device for adjusting their rear ends to a greater or lesser angle to each other and the plow-beam, as hereinafter more fully described.

A is the plow-beam, to the rear part of which is attached the upper end of the standard B. The forward edge of the standard B is made sharp, so as to act as a cutter for dividing the soil. To the lower end of the standard B is attached, or upon it is formed, the plow C, which is made with a mold-board upon each side, as shown in Fig. 2.

D are the handles, which are attached to the rear end of the beam A, and the lower ends of which are attached to the mold-boards, as shown in Fig. 1.

To the standard B is attached the forward end of the rod E, upon the rear end of which is formed a screw-thread.

F are hooks or rods, the outer ends of which are pivoted to the outer or rear parts of the mold-boards C. The forward or inner ends of the rods F have eyes formed upon them, through which passes the rod E.

G is a hand or crank nut, screwing upon the rod E in the rear of the eyes of the rods F, so that by screwing up the nut G the rear parts of the mold-boards C may be pushed outward or expanded, and by loosening up the said nut the said mold-boards will be contracted. This construction enables the plow to be adjusted according to the distance apart of the rows of plants, or according to the amount of soil desired to be thrown around the plants.

Having thus described my invention, what I claim as new, and desire to secure by Letters Patent, is—

The arrangement with reference to the beam A and mold-boards C of the pivoted rods F and screw-rod E, provided with the crank G, all combined and operating as and for the purpose set forth.

HENRY NOLTE.

Witnesses:
    FR. C. W. KOEHNLE,
    A. H. MILLER.